United States Patent [19]

Soma

[11] Patent Number: 5,156,130
[45] Date of Patent: Oct. 20, 1992

[54] FUEL INJECTION SYSTEM

[75] Inventor: Masahiro Soma, Hitachi, Japan

[73] Assignees: Hitachi, Ltd., Tokyo; Hitachi Automotive Engineering Co., Ltd., Ibaraki, both of Japan

[21] Appl. No.: 635,247

[22] Filed: Dec. 28, 1990

[30] Foreign Application Priority Data

Dec. 28, 1989 [JP] Japan .................................. 1-340683

[51] Int. Cl.$^5$ ............................................. F02M 51/00
[52] U.S. Cl. ...................................... 123/472; 123/590; 239/533.12
[58] Field of Search .................. 123/472, 470, 590; 239/463, 464, 471, 533.12, 585

[56] References Cited

U.S. PATENT DOCUMENTS

| | | | |
|---|---|---|---|
| 4,519,370 | 5/1985 | Iwata | 239/533.12 |
| 4,890,794 | 1/1990 | Imafuku | 239/533.12 |
| 4,945,877 | 8/1990 | Ziegler | 123/472 |
| 4,974,565 | 12/1990 | Hashimoto | 239/533.12 |
| 4,982,716 | 1/1991 | Takeda | 229/533.12 |
| 5,016,819 | 5/1991 | Wood | 239/585 |
| 5,018,501 | 5/1991 | Watanabe | 123/472 |

FOREIGN PATENT DOCUMENTS

| | | |
|---|---|---|
| 467724 | 10/1928 | Fed. Rep. of Germany ......................... 239/533.12 |
| 61-140174 | 8/1986 | Japan . |
| 61-167474 | 10/1986 | Japan . |
| 1-239881 | 10/1986 | Japan . |
| 3-50667 | 3/1988 | Japan . |
| 1-159460 | 6/1989 | Japan . |
| 2-99758 | 4/1990 | Japan . |
| 2-125956 | 5/1990 | Japan . |

Primary Examiner—Carl S. Miller
Attorney, Agent, or Firm—Antonelli, Terry, Stout & Kraus

[57] ABSTRACT

A fuel injection system comprises a fuel injection valve of the fuel swirling type which is provided in an intake passage upstream of an intake valve that is arranged in an inlet port, the fuel injection valve being equipped with an adapting device for adapting the form of the fuel spray, which is injected through the fuel injection valve in a swirling manner, to the configuration of the inlet port as seen from the position where the fuel injection valve is mounted. With this structure, the fuel can be prevented from impinging on the upper and lower walls of the inlet port, thereby preventing the fuel injected into the combustion chamber forming a liquid film. This helps to enhance the combustion efficiency of the associated internal combustion engine and to reduce the HC content in the exhaust gas, thereby improving the starting performance at low temperature of the engine.

2 Claims, 7 Drawing Sheets

FUEL INJECTION SYSTEM

BACKGROUND OF THE INVENTION

1. Field of the Invention

This invention relates to a fuel injection system for an internal combustion engine, and in particular, to a fuel injection system of the type in which a fuel injection valve of the fuel swirling type is provided in the intake passage at a position upstream of the intake valve.

2. Description of the Related Art

Fuel injection systems may be classed into two types: in one type of fuel injection system, the atomized fuel from the fuel injection valve assumes the form of a thin, bar-like spray directly impinging on the intake valve. In the other type, the atomized fuel from the fuel injection valve diverges conically, aimed thus at the intake valves. As disclosed, for example, in Japanese Patent Unexamined Publications No. 61-237881 and No. 63-50667, and Japanese Utility Model Unexamined Publications No. 61-140174, No. 62-101065 and No. 61-167474, the conventional fuel injection systems are all concerned with the way in which the injected fuel is directed, particularly the way in which the injection is divided and aimed at the intake valves. In Japanese Utility Model Unexamined Publication No. 61-167474, for example, which discloses a fuel injection system of the former type, the position to be aimed at by the injection and the range allowing aimed injection are specified.

In the former type of fuel injection system, in which the atomized fuel that is in the form of a thin, bar-like spray directly impinges upon the intake valve, however, the atomization is not effected to a satisfactory degree, with the result that the HC content in the exhaust gas is augmented. When starting the engine at low temperature, in particular, the atomization effect by the impinging action is diminished due to the lowered viscosity of the fuel, so that the fuel is allowed to flow into the combustion chamber of the engine as a liquid film, resulting in the starting performance of the engine being deteriorated. In the case of the latter type of fuel injection system, in which the atomized fuel spray from the injection valve conically diverges, on the other hand, no consideration is given to the specific configuration which the atomized fuel is to assume, so that the fuel spray impinges upon the upper and lower walls of the inlet ports immediately in front of the intake valves, resulting in the engine exhibiting a rather poor starting performance and the HC content in the exhaust gas being augmented.

SUMMARY OF THE INVENTION

It is accordingly an object of the present invention to provide a fuel injection system in which the atomized fuel from the fuel injection valve is prevented from impinging upon the upper and lower walls of the inlet port, thereby preventing the fuel injected into the combustion chamber from forming a liquid film and improving the combustion efficiency, resulting in the starting performance of the engine being improved due to the reduced HC content in the exhaust gas.

In accordance with the present invention, there is provided a fuel injection system for an internal combustion engine, comprising a fuel injection valve of the fuel swirling type provided in an intake passage upstream of an intake valve which is arranged in an inlet port, the fuel injection valve being equipped with an adaptation means for adapting the form of the fuel spray, which is injected by the fuel injection valve in a swirling manner, to the configuration of the inlet port as seen from the position where the fuel injection valve is mounted.

In the case of an engine in which one intake valve is provided for each cylinder, the adaptation means modifies the fuel spray such that it exhibits a section adapted to one flat configuration. In order that it may partly control the direction of the fuel that is injected through a single orifice of the fuel injection valve, the adaptation means preferably includes an injecting direction control passage which is defined by two opposing wall portions which face each other with the orifice therebetween and which are spaced away from each other by a distance slightly larger than the diameter of the orifice, and two rounded wall portions which are continuously connected to the two opposing wall portions and which are symmetrically arranged with respect to the orifice and equally spaced therefrom.

In the case of an engine in which two intake valves are provided for each cylinder, the adaptation means modifies the fuel spray such that the main stream thereof is divided into two branch streams each having a section adapted to a flat configuration. In order that it may partly control the direction of the fuel that is injected through a single orifice of the fuel injection valve, the adaptation means preferably includes an injecting direction control passage which is defined by two opposing wall portions which face each other with the orifice therebetween and which are spaced away from each other by a distance slightly larger than the diameter of the orifice, two arc-like wall portions which are symmetrically arranged with respect to the orifice and equally spaced therefrom and which have a relatively large diameter, and four curved wall portions which smoothly connected to the two opposing wall portions and the two arc-like wall portions to each other.

Assuming the distance between the two opposing wall portions is d and the diameter of the two arc-like wall portions is D, the size of these wall portions are determined such that D/d is no greater than 2.

The intake passage, which extends in the horizontal direction, supplies intake air to the combustion chamber, which is arranged vertically, obliquely from above through the inlet port. Accordingly, the intake passage is bent immediately in front of the combustion chamber. Since the fuel injection valve is provided in the intake passage at a position upstream of the intake valve, the configuration of the inlet port as seen from the position where the fuel injection valve is provided is not circular. In view of this, there may be provided a means for adapting the fuel spray injected through the fuel injection valve to the configuration of the inlet port as seen from the position where the fuel injection valve is provided, and, when there is one intake valve for each cylinder, the fuel may be injected in such a manner that the fuel spray assumes a form with a flat section. The fuel is then supplied to the combustion chamber without impinging on the upper and lower walls of the inlet port. Since the fuel does not impinge on these walls, it does not form a liquid film on the wall surface and flow into the combustion chamber. Accordingly, there is no increase in the HC content in the exhaust gas or no deterioration in the starting performance at low temperature.

In the case of an engine having two intake valves for each cylinder, injection may be effected such that the main stream of fuel spray is divided into two branch sprays each having a flat section. This arrangement helps to diminish the amount of fuel impinging on the upper and lower walls of each inlet port and the partition between the inlet ports, thereby avoiding an increase in the HC content in the exhaust gas and deterioration in the starting performance at low temperature.

The fuel is injected through the orifice in a swirling manner and directed downwards in the tangential direction of the orifice. In the case of an engine having one intake valve for each cylinder, the adaptation means includes an injecting direction control passage defined by two opposing wall portions which face each other with the orifice therebetween and which are spaced away from each other by a distance slightly larger than the diameter of the orifice, and two rounded wall portions which are continuously connected to the two opposing wall portions. Thanks to this structure, part of the fuel injected through the orifice and directed tangentially downwards is made to impinge mainly upon the two opposing wall portions, thereby controlling the injecting direction. That is, the injecting direction of the fuel spray impinging upon these opposing wall portions is modified along these wall portions. As a result, the fuel spray after passing through the injecting direction control passage exhibits a flat section, for example, an elliptical or an elongated-circle-like section.

In the case of an engine having two intake valves for each cylinder, the adaptation means includes an injecting direction control passage defined by two opposing walls which are spaced away from each other by a distance slightly larger than the diameter of the orifice, two arc-like wall portions having a relatively large diameter, and four curved wall portions which smoothly connect these wall portions to each other. Thanks to this arrangement, part of the fuel injected through the orifice and directed tangentially downwards is made to impinge mainly upon the two opposing wall portions and the four curved wall portions, and further, is partly made to impinge upon the two arc-like wall portions, thus the injecting direction being modified along these wall portions. As a result, the fuel after passing through the injecting direction control passage is in the form of two spray streams each exhibiting a substantially flat section.

DETAILED DESCRIPTION OF THE PREFERRED EMBODIMENTS

An embodiment of the present invention will now be described with reference to FIGS. 1 to 7.

Figure 2:
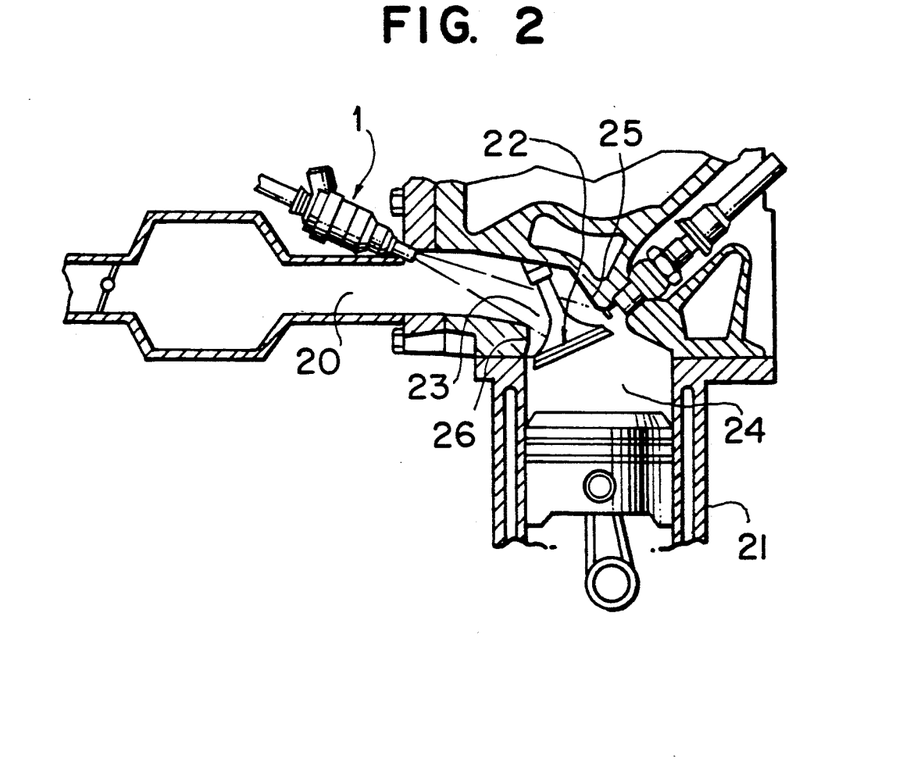
FIG. 2 is a sectional view of the fuel injection system equipped with this fuel injection valve.
Figure 3:
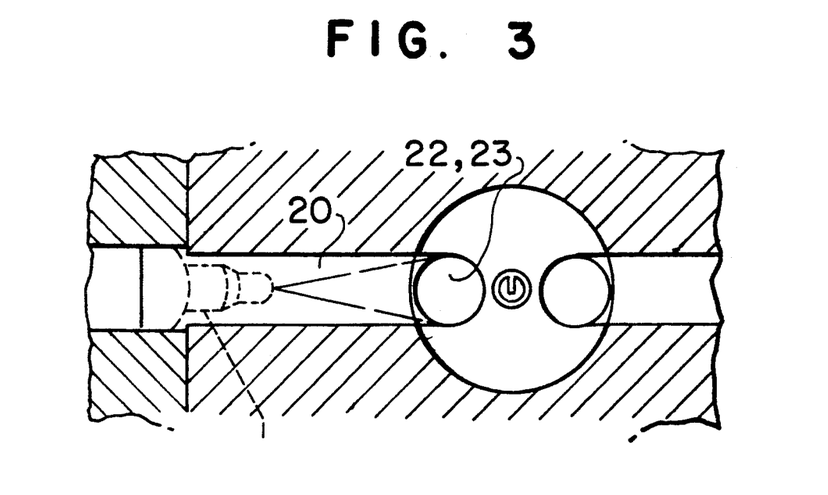
FIG. 3 is a sectional view of the same taken through the intake passage thereof.

Referring to FIGS. 2 and 3, the fuel injection system of this embodiment includes an electromagnetic fuel injection valve 1 of the fuel swirling type. This fuel injection valve 1 is provided in an intake passage 20 that extends in the horizontal direction and connects to an engine 21. The intake passage 20 is bent in front of an inlet port 23, which is adapted to be opened and closed by an intake valve 22, and communicates with a combustion chamber 24. As shown in FIG. 2, the fuel injection valve 1 is arranged in the intake passage 20 at a position on the upstream side of the intake valve 22 and is directed towards the intake valve 22.

The construction of the fuel injection valve will now be described with reference to FIG. 1. This fuel injection valve 1 includes a housing 2, which constitutes a magnetic circuit component, a core 3, which also constitutes a magnetic circuit component, an electromagnetic coil 5, into which a bobbin 4 is fitted, a plunger 7, to which a ball valve 6 is mechanically attached, and a spring 8. Mechanically attached to the lower section of the fuel injection valve 1 is a nozzle 9, which is equipped with a fuel swirling mechanism and a fuel measuring machanism.

In order to impart a swirling force to the fuel, the fuel swirling mechanism of the nozzle 9 consists of a swirler 10 having four grooves which are arranged eccentrically with respect to the central axis thereof. The fuel measuring mechanism of the nozzle 9 consists of an orifice 11 for measuring the fuel injection amount. A valve seat 12 is provided between the swirler 10 and the orifice 11, and a sliding section for the ball valve 6 is formed on the inner periphery of the swirler 10. The ball valve 6 is pressed against the valve seat 12 by the resilient force of the spring 8 which is applied thereto through the plunger 7. The swirler 10 may adopt a structure as disclosed in Japanese Patent Unexamined Publication No. 1-159460, according to which the nozzle 9 is designed to be swingable.

Figure 4:
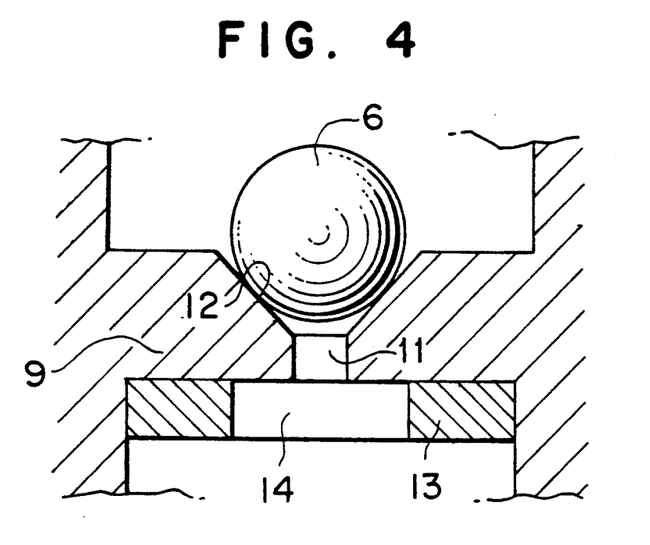
FIG. 4 is an enlarged sectional view of the essential part of the fuel injection valve.
Figure 5:
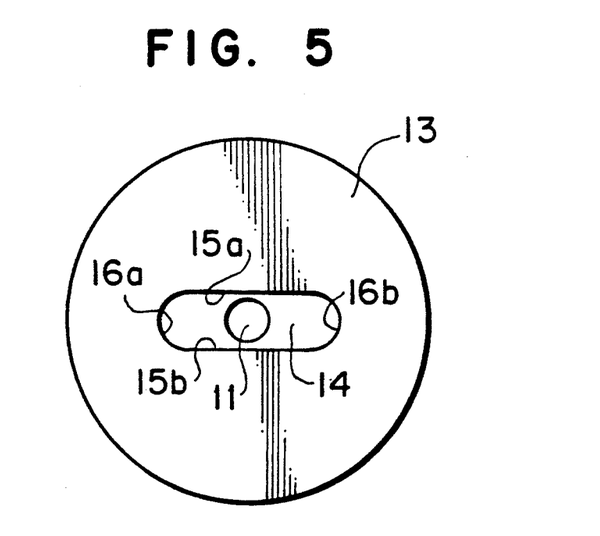
FIG. 5 is a bottom view of a nozzle adapter.

Mechanically attached to the recess on the outlet side of the orifice 11 of the nozzle 9 is a nozzle adapter 13 for adapting the form of the atomized fuel spray to the configuration of the inlet port 23 as seen from the position where the fuel injection valve 1 is mounted. This nozzle adapter 13, which constitutes the feature of this embodiment, is generally in the form of a disc and has in its center a fuel injecting direction control passage 14, which is in the form of an elongated hole, as shown in FIGS. 4 and 5. In order to partly control the direction in which the fuel is injected through the orifice 11, this fuel injecting direction control passage is defined by a pair of parallel walls 15a and 15b which face each other with the orifice 11 between them and which are spaced away from each other by a distance slightly larger than the diameter of the orifice 11, and a pair of rounded walls 16a and 16b which are continuously connected to the walls 15a and 15b and which are arranged symmetrically with respect to the orifice 11 and equally spaced away therefrom.

Next, the operation of this fuel injection system, constructed as described above, will be explained.

When electrical current is applied from a control unit (not shown) to the electromagnetic coil 5 of the fuel injection valve 1, a magnetic circuit is formed by the housing 2, the core 3 and the plunger 7, which magnetic circuit causes the plunger 7 to be attracted to the core 3, thereby separating the ball valve 6 from the valve seat 12. Fuel is introduced into the outer peripheral section of the electromagnetic coil 5 of the fuel injection valve 1 through a fuel inlet 18 and a fuel filter 17, which are provided in the side wall of the housing 2, and flows into the swirler 10, where it is imparted a swirling force. Then, it flows through the gap formed between the ball valve 6 and the valve seat 12 and is measured and injected through the orifice 11. The fuel, thus injected through the orifice 11, partly impinges on the fuel injecting direction control passage 14 of the nozzle adapter 13, and, in this process, the form of the atomized fuel spray is adapted to the configuration of the inlet port 23 as seen from the position where the fuel injection valve 1 is mounted.

As described above, the intake passage 20 extends in the horizontal direction and is bent at a position directly in front of the inlet port 23 so as to communicate with the combustion chamber 24, which means the configuration of the inlet port 23 as seen from the position where the fuel injection valve is mounted is somewhat flat, i.e., elongated-circle-like or elliptical. Accordingly, if the fuel spay diverges conically as in the above-described conventional system, the spray will impinge on the upper and lower walls 25 and 26 of the inlet port 23 and form a fuel film, resulting in an augmented HC content in the exhaust gas and a poor starting performance at low temperature.

In accordance with this embodiment, the form of the fuel spray injected by the fuel injection valve 1 is adapted to the configuration of the inlet port 23 as seen from the position where the fuel injection valve 1 is mounted by means of the injecting direction control passage 14 of the nozzle adapter 13. That is, the fuel spray is modified such that it has a section adapted to a flat, elongated-circle-like or elliptical configuration. The action of this injecting direction control passage 14 will now be described with reference to FIGS. 6 and 7.

Figure 6:
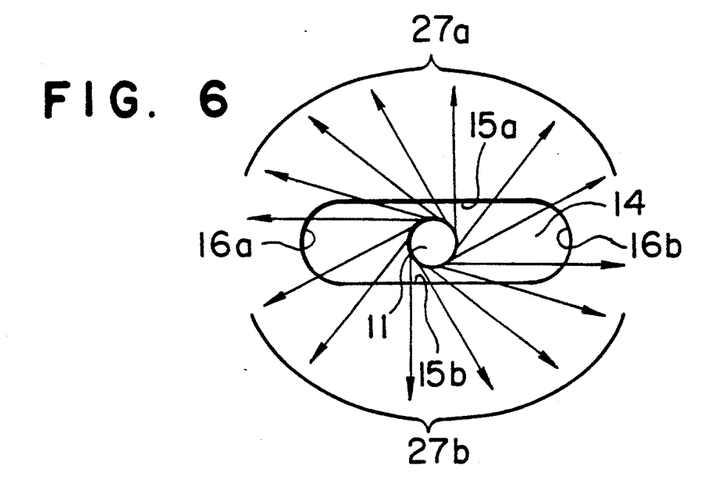
FIG. 6 is a diagram illustrating the effect of the injecting direction control passage of the nozzle adapter.
Figure 7:
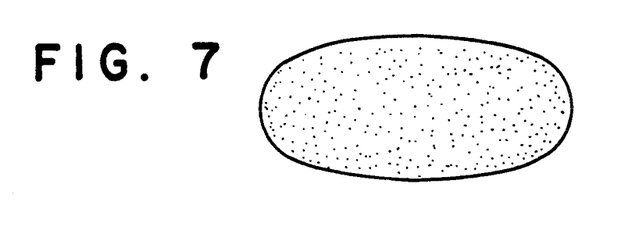
FIG. 7 is a diagram showing the section of the atomized fuel stream when it is at a position below the injecting direction control passage.

After being imparted a swirling force by the swirler 10 on the upstream side of the valve seat 12, the fuel is injected through the tip of the orifice 11 and directed tangentially downwards, as shown in FIG. 6. In this process, the fuel portions injected in the directions 27a and 27b respectively impinge on the side walls 15a and 15b, which are spaced away from each other by a distance slightly larger than the diameter of the orifice 11, and partially on the two rounded walls 16a and 16 b. By thus causing the fuel to impinge on these walls, the injecting direction thereof is controlled and the fuel is injected along the side walls 15a and 15b, with its directions of injection being controlled. After thus being ejected, the fuel spray has a flat, elongated-circle-like or elliptical section as shown in FIG. 7. The configuration and size of this elongates section is determined b the configuration and size of the walls 15a, 15b, 16a, and 16b of the injecting direction control passage 14. Through appropriate selection of these factors, the configuration and size of the spray when it reaches the inlet port 23 can be conformed to those of the inlet port.

In the above process, part of the injected fuel is controlled in its direction, with the result that part of the injection energy is lost accordingly, which means the atomization of the fuel is hindered to some extent. Since, however, the height of the walls 15a, 15b, 16a and 16b is very small, the hindering of the atomization only occurs to a negligible degree. Furthermore, since the well atomized fuel portion obtained by swirling is retained, the deterioration in atomization as a whole is negligible.

Thus, in accordance with this embodiment, well atomized fuel can be supplied to the combustion chamber without allowing it to impinge upon the upper and lower walls 25 and 26 of the inlet port 23, so that the HC content in the exhaust gas can be reduced, thus improving the exhaust performance of the engine. In addition, atomized fuel can be supplied to the engine even at low temperature, thus improving the starting performance of the engine.

Figure 8:
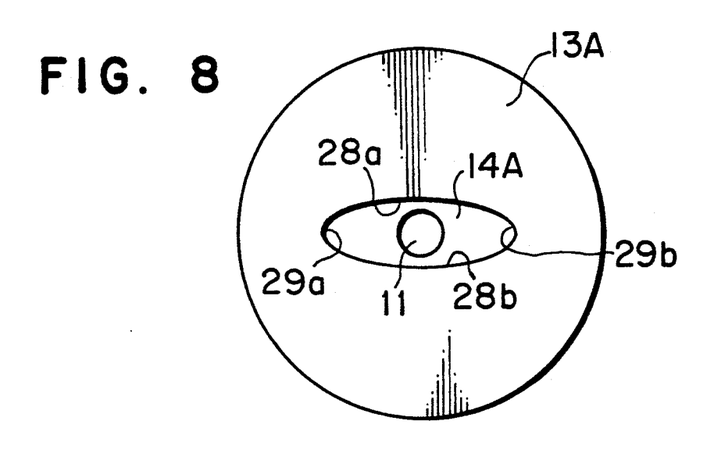
FIG. 8 is a diagram showing a modification of the nozzle adapter.

Although in the above-described embodiment the injecting direction control passage is in the form of an elongated hole, it may also be an elliptical hole depending on the configuration of the inlet port 23 as seen from the position where the fuel injection valve is mounted. FIG. 8 shows such a modification. In this modification, the nozzle adapter 13A has an injecting direction control passage 14A with an elliptical section. This passage 14A is related to the orifice 11 in substantially the same manner as the above-described elongated-hole-like passage 14 to the orifice 11. In order to partly control the direction of the fuel injected through the orifice 11, this injecting direction control passage 14A is defined by a pair of opposing wall portions 28a and 28b which face each other with the orifice 11 between them and which are spaced away from each other by a distance slightly larger than the diameter of the orifice 11, and a pair of rounded wall portions 29a and 29b which are continuously connected to the walls 28a and 28b and which are arranged symmetrically with respect to the orifice 11 and equally spaced away therefrom. This modification provides an effect which is similar to that obtained in the abovedescribed embodiment.

Another embodiment of this invention will now be described with reference to FIGS. 9 to 13. In this embodiment, the present invention is applied to an internal combustion engine 30 having two intake valves for each cylinder.

Figure 9:
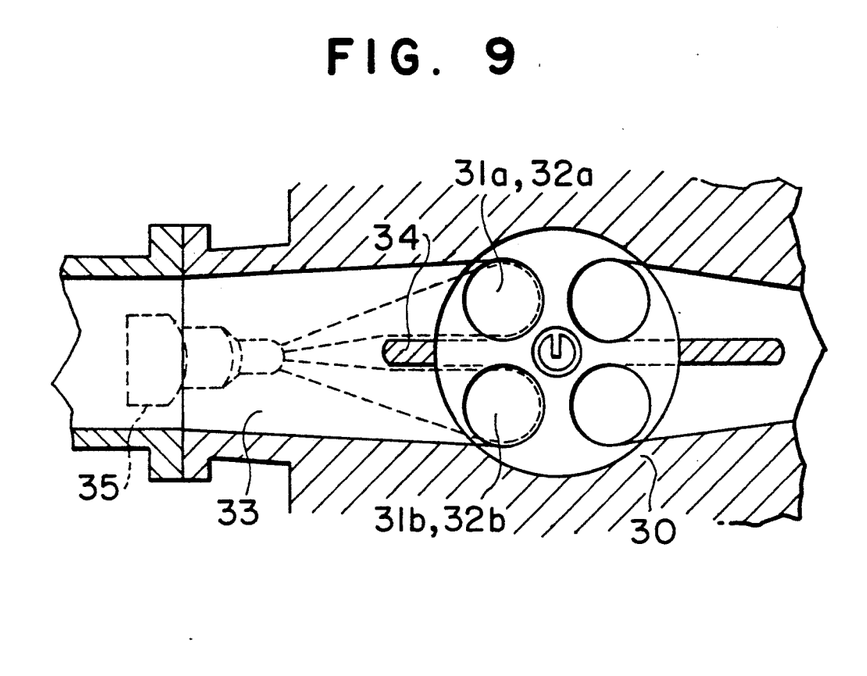
FIG. 9 is a sectional view of a fuel injection system in accordance with another embodiment of the present invention taken through the intake passage thereof.

Referring to FIG. 9, the engine includes two inlet ports 32a and 32b, which are adapted to be opened and closed by means of two intake valves 31a and 31b, respectively. As in the engine shown in FIG. 2, the intake passage 33 of this engine 30 extends in the horizontal direction and is bent immediately in front of the two inlet ports 32a and 32b so as to communicate with the combustion chamber. A fuel injection valve 35 in accordance with this embodiment is provided in the intake passage 33 at a position on the upstream side of the intake valves 31a and 31b and is directed towards these intake valves.

Figure 1:
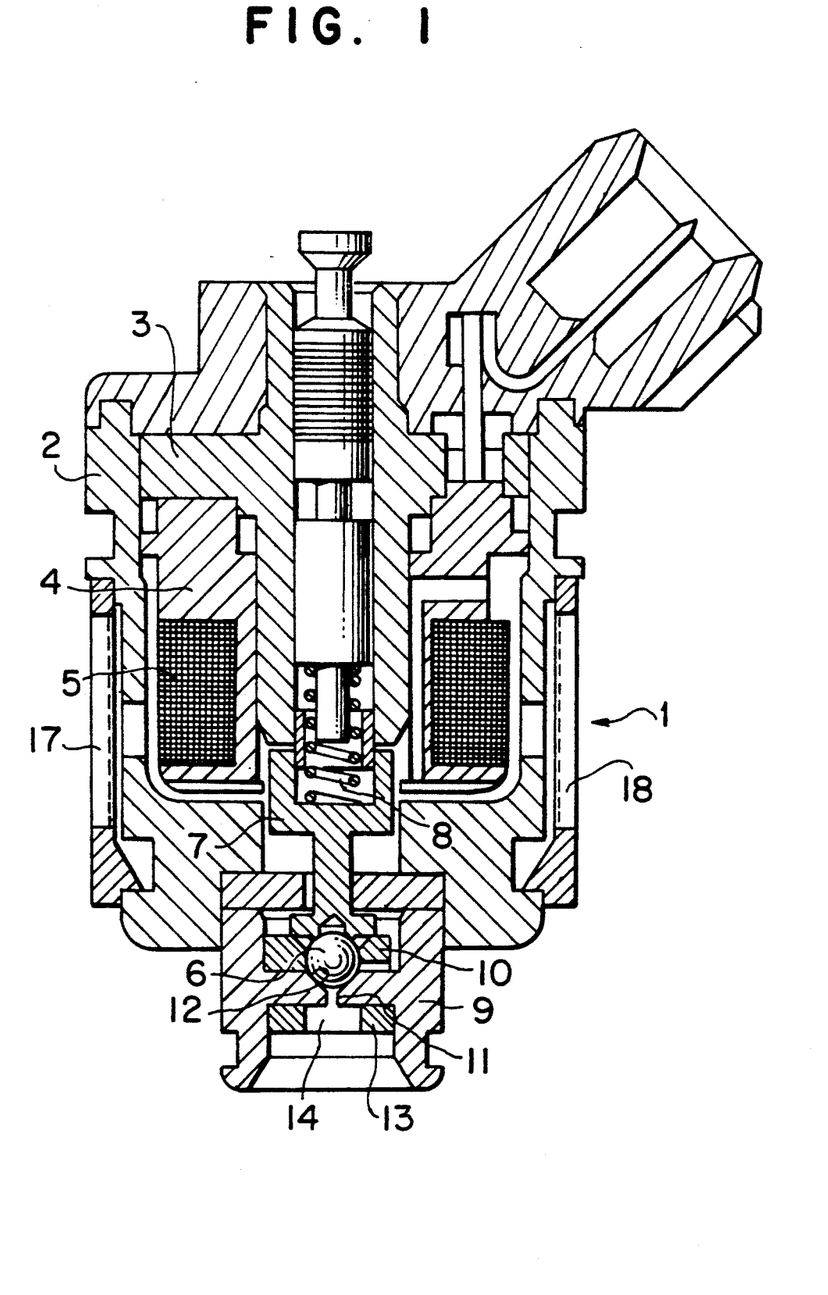
FIG. 1 is a longitudinal sectional view of a fuel injection valve to be used in a fuel injection system in accordance with an embodiment of the present invention.

The fuel injection valve 35 has the same structure as that of the fuel injection valve of the embodiment shown in FIG. 1, except for the nozzle adapter for modifying the form of the fuel spray.

Figure 10:
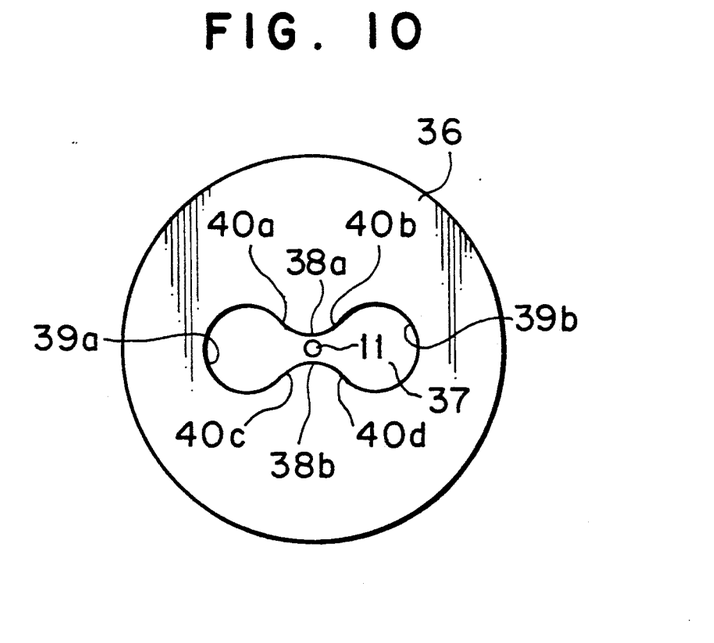
FIG. 10 is a bottom view of the nozzle adapter used in the fuel injection system shown in FIG. 9.

In accordance with this embodiment, the nozzle adapter 36, provided on the outlet side of the orifice 11 of the nozzle, has an injecting direction control passage 37 as shown in FIG. 10. In order to partly control the direction of the fuel injected through the orifice 11, the passage 37 is defined by a pair of opposing wall portions 38a and 38b which face each other with the orifice 11 between them and which are spaced away from each other by a distance slightly larger than the diameter of the orifice 11, a pair of arc-like wall portions 39a and 39b which have a relatively large diameter and which are arranged symmetrically with respect to the orifice 11 and equally spaced away therefrom, and four wall portions 40a, 40b, 40c, and 40d which smoothly connect the two opposing wall portions 38a and 38b and the two arc-like wall portions 39a and 39b to each other.

In the case of the engine 30, which has two intake valves 31a and 31b for each cylinder, the injected fuel impinges not only on the upper and lower walls of L the inlet ports 32a and 32b but also on a partition 34 separating the two inlet ports 32a and 32b from each other. In view of this, an engine of this type has conventionally adopted a two-way injection valve which injects fuel in two directions.

Figure 11:
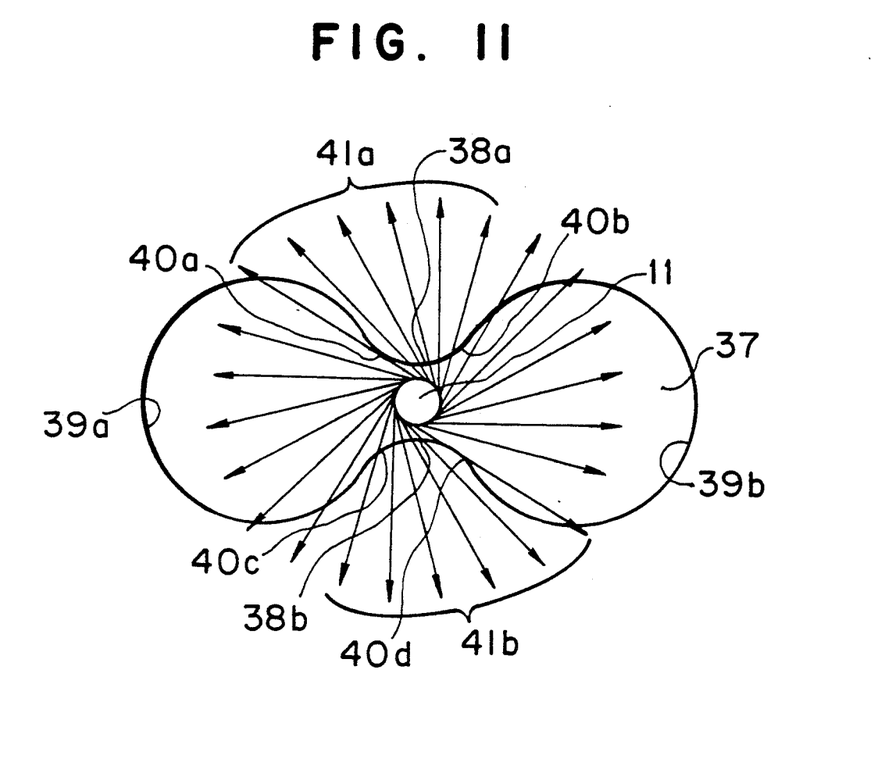
FIG. 11 is a diagram illustrating the effect of the injecting direction control passage of the nozzle adapter shown in FIG. 10.
Figure 12:
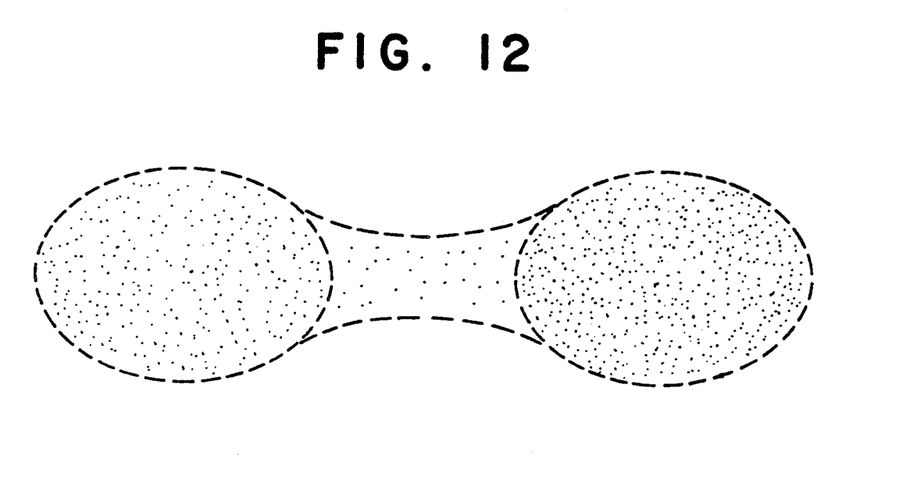
FIG. 12 is a diagram showing the section of the atomized fuel stream when it is at a position below the injecting direction control passage.

In accordance with this embodiment, the nozzle adapter 36 having the injecting direction control respective sections of which are adapted to the configuration of the inlet ports 32a and 32b as seen from the position where the fuel injection valve 35 is mounted. That is, the respective sections of the two branch streams of the fuel spray are adapted to two elongated circles or ellipses, as shown in FIGS. 11 and 12. The fuel is injected in a swirling manner through the tip of the orifice 11 and directed tangentially downwards, as shown in FIG. 11. In this process, the fuel portions injected in the directions indicated by the reference numerals 41a and 41b substantially impinge on the entire surface of the opposing wall portions 38a and 38b and of the four curved wall portions 40a to 40d, and partially on the surface of the two arc-like wall portions 39a and 39b, the injecting direction being modified along these wall portions. As a result, the fuel spray after passing through the injecting direction control passage 37 is substantially in the form of two spray streams each having a flat section, as shown in FIG. 12. The configuration of these flat sections are determined by the configuration of the wall portions 38a, 38b, 39a, 39b, and 40a to 40d, and is particularly influenced by the ratio of the diameter D of the arclike wall portions 39a and 39b to the dimension of the distance d between the opposing wall portions 38a and 38b which are spaced away from each other by a distance slightly larger than the diameter of the orifice 11.

Figure 13A:
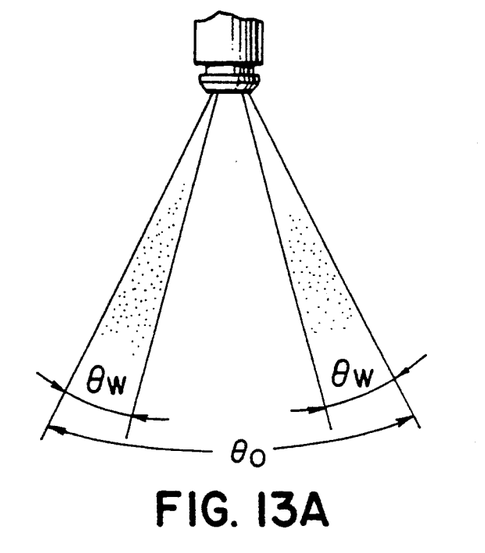
FIGS. 13A-13D are diagrams showing the relationship between the configuration of the nozzle adapter and the injection angle in the fuel injection system shown in FIG. 9.
Figure 13B:
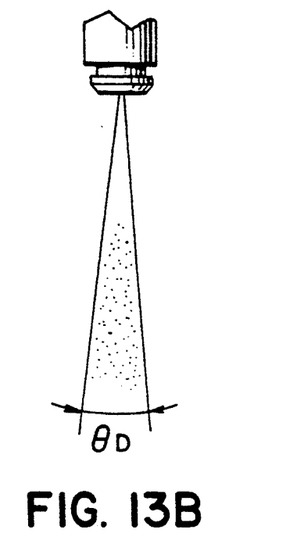
Figures 13C, 13D:
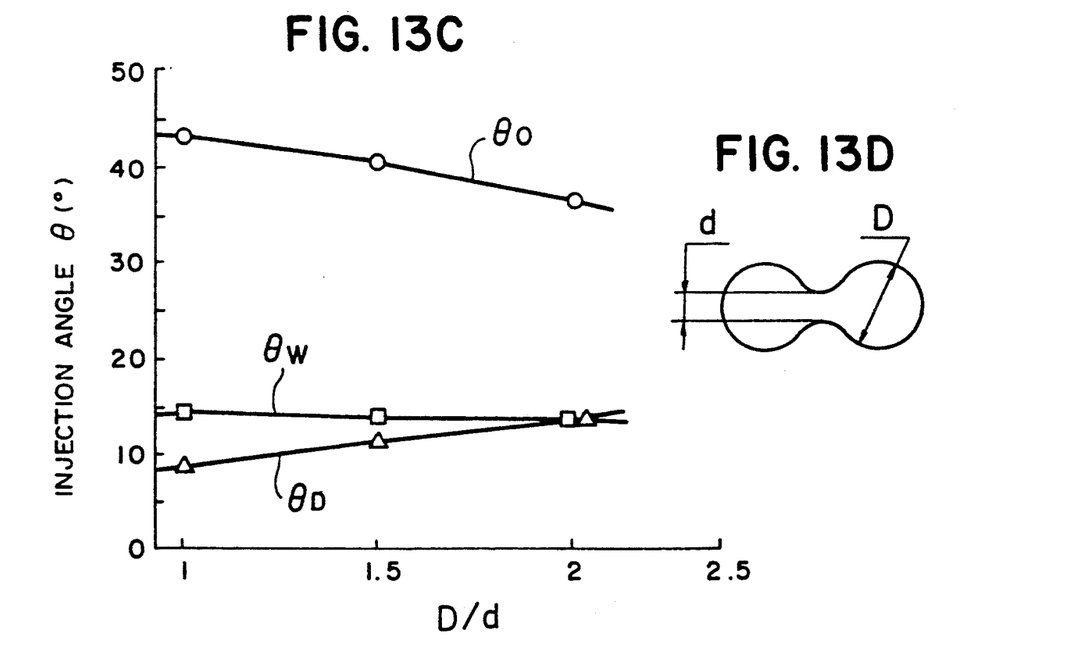

FIG. 13 shows the relationship between the ratio D/d and the injection angles $\theta$. In FIG. 13, the angle $\theta_W$ is the injection angle of each of the two spray streams of atomized fuel of FIG. 12 as seen from above, and the angle $\theta_D$ is the injection angle of the same as seen in the horizontal direction. The angle $\theta_O$ is the injection angle of the two spray streams of atomized fuel of FIG. 12 as seen from the above. As can be seen from FIG. 13, when D/d is approximately 2, $\theta_W = \theta_D$, and, when D/d < 2, $\theta_W > \theta_D$. Accordingly, the desired flat spray configuration shown in FIG. 12 can be obtained by setting the ratio D/d at no greater than 2.

The direction of part of the injected fuel is also controlled in this case, so that there is so much of injection energy loss, hindering the atomization to some extent. Since, however, the degree of hindering is so small, as in the above embodiment, and the well atomized fuel portion obtained by swirling is retained, the deterioration in atomization as a whole is negligible.

Thus, in accordance with this embodiment, the amount of fuel impinging on the partition 34 between the inlet ports 32a and 32b can be reduced, and, at the same time, atomized fuel can be supplied to the engine without allowing it to impinge on the upper and lower walls of the inlet ports 32a and 32b, so that the exhaust gas performance of the engine can be improved. In particular, the content of HC in the exhaust gas can be reduced. In addition, since atomized fuel can also be supplied to the engine at low temperature, the starting performance of the engine is improved.

Thus, the present invention makes it possible to reduce the amount of fuel impinging on the upper and lower walls of the inlet ports and to supply well atomized fuel to the engine, thereby reducing the HC exhaust amount and improving the starting performance of the engine at low temperature.

What is claimed is:

1. A fuel injection system for an internal combustion engine, comprising a fuel injection valve of the fuel swirling type provided in an intake passage upstream of an intake valve which is arranged in an inlet port, said fuel injection valve being equipped with an adaptation means for adapting the form of the fuel spray, which is injected by the fuel injection valve in a swirling manner, to the configuration of said inlet port as seen from the position where said fuel injection valve is mounted;
    wherein two intake valves are provided for each cylinder of said internal combustion engine, and wherein said adaptation means modifies the fuel spray, which is injected through said fuel injection valve in a swirling manner, such that the main stream thereof is divided into two branch streams each having a section with a flat configuration; and
    wherein said fuel injection valve has as single fuel injection orifice, and wherein, in order to partly control the direction of the fuel injected through said orifice, said adaptation means consists essentially of an injecting direction control passage which is defined by two opposing wall portions which face each other with said orifice between and which are spaced away from each other by a distance slightly larger than the diameter of said orifice, two arc-like wall portions which have a relatively large diameter and which are arranged symmetrically with respect to said orifice and equally spaced away therefrom, and four curved wall portions which smoothly connect said two opposing wall portions and said two arc-like wall portions to each other.

2. A fuel injection system as claimed in claim 1, wherein the size of said wall portions are determined such that, assuming the distance between said two opposing wall portions is d and the diameter of said two arc-like wall portions is D, the value of D/d is no greater than 2.

* * * * *